United States Patent [19]
Johansson

[11] Patent Number: 5,680,235
[45] Date of Patent: Oct. 21, 1997

[54] OPTICAL MULTICHANNEL SYSTEM

[75] Inventor: Bengt Johansson, Hägersten, Sweden

[73] Assignee: Telefonaktiebolaget LM Ericsson, Stockholm, Sweden

[21] Appl. No.: 421,734

[22] Filed: Apr. 13, 1995

[51] Int. Cl.$^6$ .................................................. H04B 10/08
[52] U.S. Cl. .................... 359/110; 359/119; 359/173; 359/128
[58] Field of Search .................... 359/119, 110, 359/117, 128, 139, 173; 370/67, 124

[56] References Cited

U.S. PATENT DOCUMENTS

| | | | |
|---|---|---|---|
| 4,704,713 | 11/1987 | Haller et al. | 359/119 |
| 4,761,832 | 8/1988 | Gade et al. | 359/117 |
| 4,973,953 | 11/1990 | Shimokawa et al. | 359/119 |
| 5,058,101 | 10/1991 | Albanese et al. | 359/127 |
| 5,127,067 | 6/1992 | Delcoco et al. | 385/24 |
| 5,271,075 | 12/1993 | Gfeller et al. | 385/20 |
| 5,295,012 | 3/1994 | Wilson et al. | 359/135 |
| 5,317,198 | 5/1994 | Husbands | 359/118 |
| 5,351,317 | 9/1994 | Weber | 385/3 |

FOREIGN PATENT DOCUMENTS

| | | | |
|---|---|---|---|
| 487392-A1 | 5/1992 | European Pat. Off. | |
| 0012449 | 1/1983 | Japan | 359/119 |
| 0077344 | 5/1983 | Japan | 359/119 |
| 0222535 | 10/1991 | Japan | 359/119 |

OTHER PUBLICATIONS

A.F. Elrefaie et al., "Fiber–amplifier Cascades in 4–fiber Multiwavelength Interoffice Ring Networks", *Proc. IEEE LEOS 1994*, Optical Networks and Their Enabling Technologies, pp. 31–32 (1994).

K. Bala et al., "Cycles in Wavelength Routed Optical Networks", *Proc. IEEE LEOS 1994*, Optical Networks and Their Enabling Technologies, pp. 7–8 (1994).

C.A. Brackett et al., "A Scalable Multiwavelength Multihop Optical Network: A Proposal for Research on All–Optical Networks", *IEEE J. Lightwave Technology*, vol. LT–11, pp. 736–753 (May/Jun. 1993).

C.M. Miller et al., "Passive Tunable Fiber Fabry–Perot Filters for Transparent Optical Networks", *Proc. 3rd IEEE International Workshop on Photonics Networks, Components, and Applications*, Atlanta, Georgia (1993).

V. Mizrahi et al., "Four channel fibre grating demultiplexer", *Electronics Letters*, vol. 30, No. 10 (1994).

J.E. Baran et al., "Multiwavelength performance of an apodized acousto–optic switch", *Proc. OFC'94* Paper No. TuM5.

(List continued on next page.)

*Primary Examiner*—Leo Boudreau
*Assistant Examiner*—Kinfe-Michael Negash
*Attorney, Agent, or Firm*—Burns, Doane, Swecker & Mathis, L.L.P.

[57] ABSTRACT

A communication network has a flexible bi-directional bus architecture (FBDNA) and is arranged as a ring structure. Each node of the network has at least one on/off node switch, i.e., a switch that permits or blocks transmission around what would otherwise be a ring. If the network has one node switch per node, one node switch is set initially off to avoid problems with circulating amplified spontaneous emission (ASE) normally associated with a ring structure. If a fiber break occurs, the node switch (or node switches) in the node (or nodes) next to the break and on the same side of the node as the break switches off, and the node switch that was off before the break switches on, permitting the network to operate largely as before. If the network has two node switches per node, two node switches next to each other in neighboring nodes are initially set off, and if a cable break occurs, both node switches around a break switch off, and the node switches that were initially off switch on. The network provides protective switching of traffic and solves the problem of circulating ASE in a simple and economical way. The network also permits wavelength reconfiguration to reduce the number of required wavelengths.

22 Claims, 5 Drawing Sheets

OTHER PUBLICATIONS

G.R. Hill et al., "A Transport Network Layer Based on Optical Network Elements", *IEEE J. Lightwave Technology*, vol. LT–11, pp. 667–676 (May/Jun. 1993).

Fiber Fabry–Perot Tunable Filter, FFP–TF, Data Sheet No. 9402–TF, Micron Optics, Inc.

JDS Fitel, 1993 Product Review, Fiber Amplifier Products—Components.

OPTICAL MULTICHANNEL SYSTEM

BACKGROUND

Applicant's invention relates to telecommunication networks that use optical fibers.

Optical systems and circuits have become more and more important for data communication systems. Optical fiber networks are particularly useful in telecommunications systems because optical fibers have large transmission capacity without electromagnetic interference and ground loop problems.

With the demand for transmission capacity increasing, as for example in broad-band multimedia telecommunications, there is a need for optical multichannel systems. Optical multichannel systems will probably change network design strategies during the coming years. By using multichannel techniques, increased transmission capacity and flexibility can be realized on existing fiber cables without increasing modulation speed or adding more complex control functions.

A ring architecture is common for communication networks, and when using optical fiber cables, the ring usually has one fiber carrying normal traffic in one direction and another fiber carrying the same traffic in the other direction for protection against traffic loss due to a fiber break. In this way, each node in the network can be reached in two separate ways with just one optical fiber cable, so if a fiber break occurs in one direction, the traffic can be transmitted across the other fiber in the other direction.

Optical fiber amplifiers are usually provided to compensate for signal attenuation. Erbium-doped fiber amplifiers (EDFAs) are the most common and so far the best, but there are also other candidates. While such amplifiers compensate for signal attenuation, they can also magnify their own spontaneous emissions, leading to problems in ring architectures. In particular, amplified spontaneous emission (ASE) from the optical amplifiers can circulate in the loop if no special measures are taken to prevent this. The ASE circulation leads to saturation, higher noise level and oscillations. This problem appears not to be easily solved with optical filters.

One way of providing the desirable signal protection is described in A. F. Elrefale et al., "Fiber-amplifier Cascades in 4-fiber Multiwavelength Interoffice Ring Networks", *Proc. IEEE LEOS* 1994, Optical Networks and Their Enabling Technologies, pp. 31–32 (1994). One limitation of this system is the circulating ASE problem.

Circulating ASE and techniques for coping with it are described in K. Bala et al., "Cycles in Wavelength Routed Optical Networks", id., at pp. 7–8. Although this system solves the problem of ASE by breaking oscillating cycles, it does not provide the desirable protection of a bi-directional bus network.

A scalable, multi-wavelength, multi-hop optical network and various aspects of optical multichannel systems are described in C. A. Brackett et al., "A Scalable Multiwavelength Multihop Optical Network: A Proposal for Research on All-Optical Networks", *IEEE J. Lightwave Technol.* vol. LT-11, pp. 736–753 (May/June 1993). This system focuses on scaling the number of channel wavelengths and reconfiguration of wavelengths and does not solve the problems of circulating ASE.

Other aspects of optical multichannel systems and components useful for such systems are described in C. M. Miller et al., "Passive Tunable Fiber Fabry-Perot Filters for Transparent Optical Networks", *Proc. 3rd IEEE International Workshop on Photonics Networks, Components, and Applications,* Atlanta, Ga. (1993); V. Mizrahi et al., "Four channel fibre grating demultiplexer", *Electronics Letters* vol. 30, no. 10 (1994); and J. E. Baran et al., "Multiwavelength performance of an apodized acousto-optic switch", *Proc. OFC'94* Paper No. TuM5. These publications describe in detail various filtering arrangements that can be used in the nodes of an optical network for wavelength division multiplexing (WDM), i.e., to select channels of different wavelengths.

U.S. Pat. No. 4,973,953 to Shimokawa et al. discloses a data transmission system which transmits data between nodes linked in ring form. Each node includes two transmitter circuits for simultaneously transmitting data and frame signals in opposite directions and a control circuit for detecting data transmission faults and supervising data transmission of the system according to the location of the fault in the system. Nevertheless, the Shimokawa system is not an optical system but is all electrical, and the Shimokawa system is not a multichannel system but is only a single (electrical) channel system. Also, the Shimokawa system terminates the electrical signal, processes it, and re-transmits it, in each node. Thus, the Shimokawa system does not provide direct node to node communication.

U.S. Pat. No. 4,704,713 to Hallet et al. discloses an optical fiber ring network which is capable of operating if one of the nodes in the ring fails. Each node is able to diagnose a failure of its own main receiver or of a transmitter in the immediately adjacent upstream node. In either case, the node switches from its main receiver to its alternate receiver to bypass the upstream node while enabling the remainder of the ring to continue functioning. In the Haller system, two wavelengths are used for sending traffic one and two nodes downstream. Thus, the Haller patent does not describe an optical multichannel system as that term is commonly understood. Moreover, the Haller patent is directed to solving node failure problems, not cable breaks.

European Patent Publication No. EP 0 487 392 to Dequenne discloses a bi-directional optical multiplexing system which uses different wavelengths for transmission in two directions around an optical fiber loop. The nodes communicate bi-directionally with four wavelengths through the same fiber. Nevertheless, the channels are terminated in each node.

SUMMARY

In accordance with Applicant's invention, there is provided a communication network having a bi-directional bus architecture, in which each node has at least one on/off node switch, i.e., a switch that permits or blocks transmission around what would otherwise be a ring. At any given time, at least one node switch is off, thereby avoiding problems with circulating amplified spontaneous emissions. If a fiber break occurs, the node switch (or node switches) in the node adjacent to the break and on the same side of the node as the break is (are) switched off, and the node switch (or node switches) switched off before the break is (are) switched on. This permits the network to operate largely as before. Thus, Applicant's invention provides a bi-directional bus in which a protection cable is drawn the shortest way, leading to a ring structure.

In one aspect of Applicant's invention, an optical fiber communication network for transmitting information on wavelength channels comprises a cable having two optical fibers; a plurality of nodes connected by the cable; and a plurality of node switches, one for each node. The nodes are arranged in a ring, and the nodes and cable form a bi-directional bus. Every node switch but one is in an on position permitting transmission of information, and one node switch is in an off position blocking transmission of information. The network further includes a device for detecting a break in the cable and a device for switching, in response to detection of the break, the node switch that is in the off position to an on position and the node switch in a node adjacent to the break and on the same side of the node as the break to an off position.

In another aspect of Applicant's invention, an optical fiber communication network for transmitting information on wavelength channels comprises a cable having two optical fibers; a plurality of nodes connected by the cable, the nodes being arranged in a ring and the nodes and cable forming a bi-directional bus; and a plurality of node switches, one on each side of each node, wherein a first node has a first switch on one side in an off position and a second node adjacent to the first node on the same side as the first switch has a second switch on that same side in an off position, the first and second switches blocking transmission, and every other switch in an on position permitting transmission of information. The network further comprises a device for detecting a break in the cable and a device for switching, in response to detection of the break, the first and second node switches that are in the off position to an on position and the node switches adjacent to the break on both sides of the break to an off position.

In such networks, each node may include at least two receivers and one transmitter for a respective wavelength channel, and optical pre-amplifiers. Each network may further include a wavelength reconfiguration device for permitting re-use of a wavelength, the wavelength reconfiguration device reducing a number of wavelengths used in the network from $M(M-1)/2$ to $(M2-1)/4$, where M is the number of nodes. The wavelength reconfiguration device may include an add-drop filter that is one of an optical circulator and a Fabry-Perot etalon, an optical circulator and a fiber grating, two three-port Fabry-Perot etalons, and an acousto-optic transmission filter.

In another aspect, Applicant's invention provides a method of transmitting information on wavelength channels in an optical fiber communication network having a number of nodes and a cable including two optical fibers, the nodes being arranged in a ring, the nodes and cable forming a bi-directional bus, and each node including one node switch. The method comprises the steps of setting every node switch but one in an on position permitting transmission of information; setting one node switch in an off position blocking information transmission; detecting a break in the cable; and when a break is detected, setting the node switch that is in the off position to an on position, and setting the node switch in a node adjacent to the break and on the same side of the node as the break to an off position.

In another aspect, Applicant's invention provides a method of transmitting information on wavelength channels in an optical fiber communication network having a number of nodes and a cable including two optical fibers, the nodes being arranged in a ring, the nodes and cable forming a bi-directional bus, and each node including a node switch on each side of the node. The method comprises the steps of setting a first switch on one side of a first node in an off position and a second switch in a second node adjacent to the first node on the same side as the first switch in an off position, the first and second switch blocking transmission of information; setting every other node switch in an on position permitting transmission of information; detecting a break in the cable; and when a break is detected, setting the first and second node switches that are in the off position to an on position and the node switches adjacent to the break on both sides of the break to an off position.

Each method may further comprise the step of re-configuring wavelengths in the network to permit re-use of a wavelength to reduce a number of wavelengths in the network from $M(M-1)/2$ to $(M^{2-1})/4$, where M is the number of nodes. The re-configuring step may include the step of add-drop filtering that is performed by one of an optical circulator and a Fabry-Perot etalon, an optical circulator and a fiber grating, two three-port Fabry-Perot etalons, and an acousto-optic transmission filter.

BRIEF DESCRIPTION OF THE DRAWINGS

Applicant's invention is described below in more detail with reference to preferred embodiments, given only by way of example and illustrated in the accompanying drawings, in which.

DETAILED DESCRIPTION

Applicant's network reflects a flexible bi-directional network architecture (FBDNA) that solves the problem of circulating ASE at the same time as it maintains a ring structure. It also provides the desired protection against transmission loss due to cable breakage without wasting any fiber or number of wavelengths compared with a uni-directional ring. (A bi-directional bus requires fewer wavelengths than a uni-directional ring). It also is an economical solution since it requires relatively few and not-so-advanced components compared to other solutions.

Figure 1A:
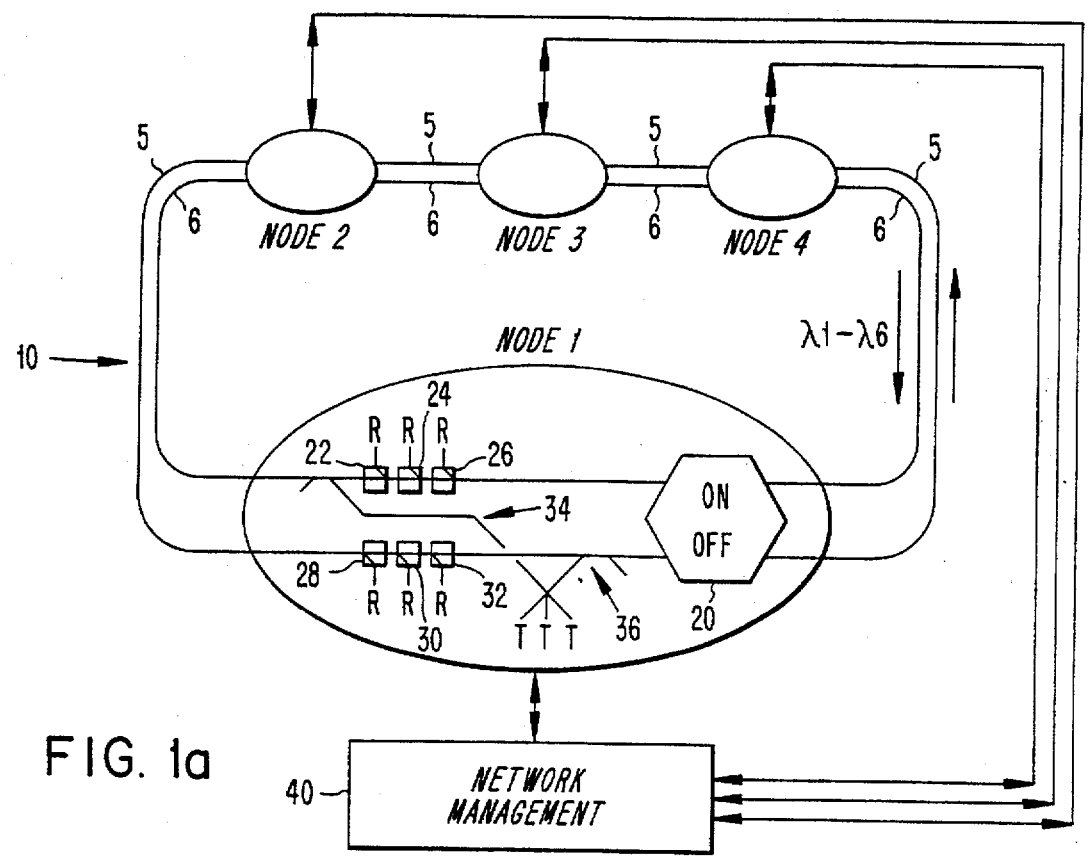
FIG. 1a is a diagram of a network in accordance with Applicant's invention.
Figure 1B:
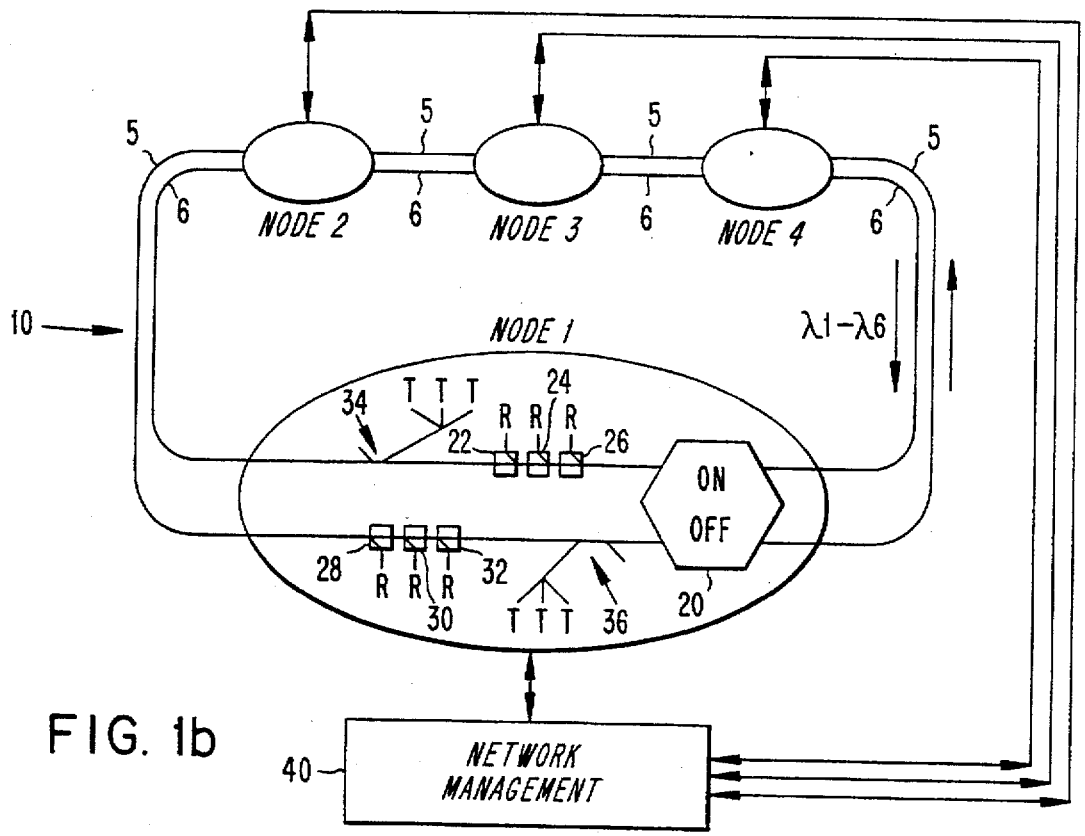
FIG. 1b is a diagram of a network permitting wavelength re-use in accordance with Applicant's invention.

FIGS. 1a, 1b illustrate network structures 10 that are built as loops of two optical fibers 5, 6, each loop of optical fibers 5, 6 optically forming one bi-directional bus for transmitting wavelength channels $\lambda 1$–$\lambda 6$ from node to node. FIGS. 1a, 1b each show four nodes 1, 2, 3, 4, although it will be appreciated that more or fewer nodes could be used. Each of the nodes 1, 2, 3, 4 contains an on/off switching device 20, and all but one of these switches are set in a transmitting (on) position. FIGS. 1a, 1b show expanded views of node 1, which includes one switch 20. The bus starts and stops at the one blocking (off) switch, and thus no problems with circulating ASE can occur. The switching device 20 can be a conventional optical switch or a pair of optical amplifiers that can be turned on and off.

Each node also includes means for selecting a desired wavelength channel. The selectors, or filters, may be wavelength division multiplexers (WDMs), or combinations of an ordinary optical fiber coupler and an optical filter. (The latter precludes re-use of wavelengths).

Each node also typically includes, for each wavelength channel, a respective receiver R for each fiber 5, 6. As indicated in FIGS. 1a, 1b, node 1 has six receivers R and six WDMs 22, 24, 26, 28, 30, 32, three of each for each fiber 5, 6, and thus it can be seen that node 1 can receive three of the six wavelength channels λ1–λ6. The desired signal would reach only one of a node's two receivers at the same wavelength since the signal would be present in only one of the two fibers 5, 6.

Standard software or switches can be used to choose the right receiver, the details of which are not essential to the present invention and will not be further described here.

Each node further includes one or more transmitters T that are coupled to both optical fibers 5, 6 by either WDMs or ordinary couplers, enabling the transmitters T to send in both directions. As indicated in FIG. 1a, node 1 has three transmitters T that are coupled to the fibers 5, 6, by two couplers 34, 36. FIG. 1b shows a network that permits wavelength re-use with six transmitters T coupled to the fibers 5, 6 by couplers 34, 36.

The transmitters T may be semiconductor diode lasers or other suitable light sources. Light-emitting semiconductor diodes (LEDs) are generally not suitable transmitters since they have broad wavelength spectra and are therefore difficult to separate from each other. If LEDs are used, only a few channels can be transmitted since they fill up the fiber's available spectrum, and special types of filters must be used. Semiconductor lasers that are suitable transmitters include distributed feedback (DFB) lasers and distributed Bragg reflector (DBR) lasers. For narrow channel spacing, the lasers must be nearly chirp free. A good way to prevent chirp is to use integrated electro-optic modulators with the lasers.

The receivers and transmitters might be standard components or more advanced devices such as coherent transceivers that have been described in the literature referred to above. One of the benefits of coherent systems is the possibility of electrical filtering.

Figure 2A:
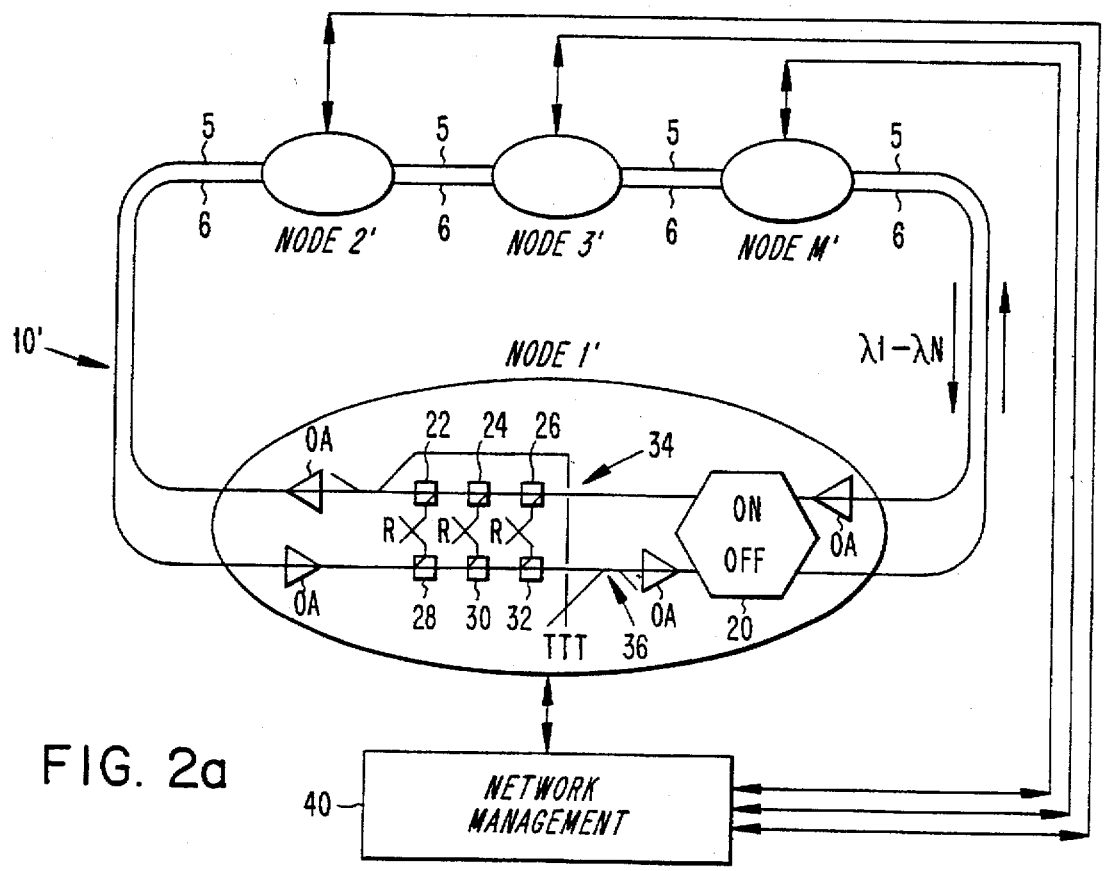
FIGS. 2a–2d depict other networks in accordance with Applicant's invention.
Figure 2B:
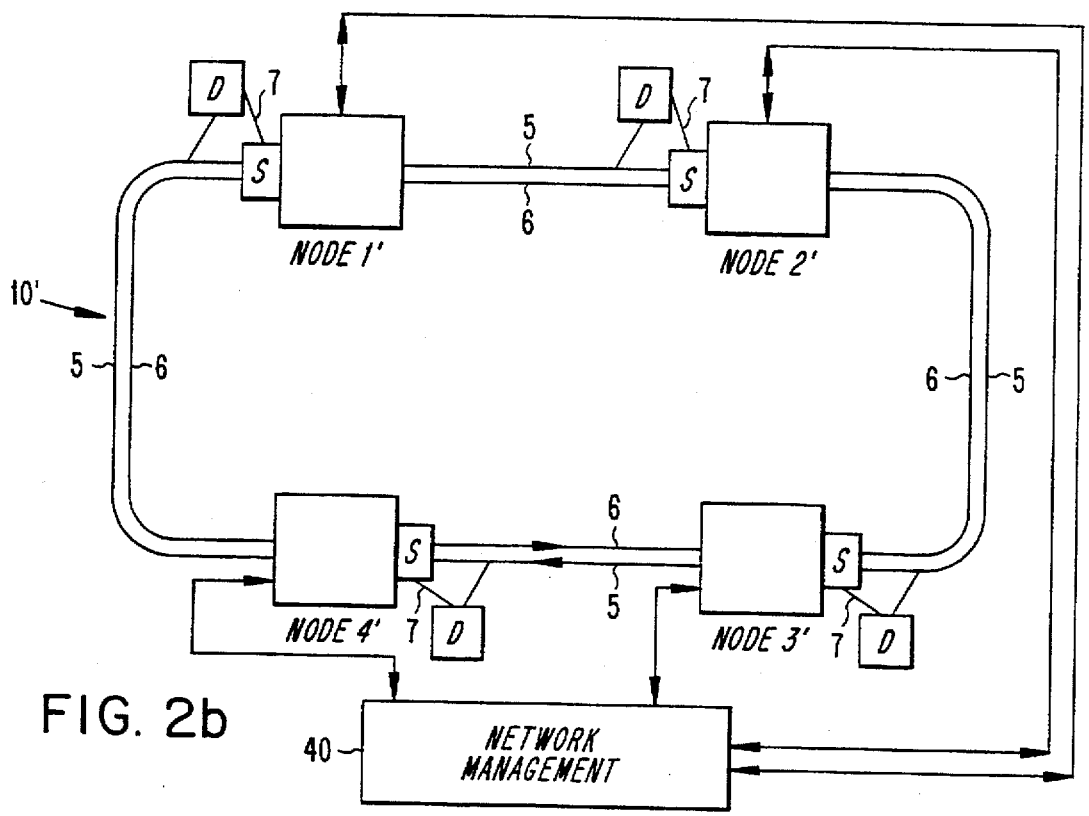

FIGS. 2a–2d show networks 10' in which the nodes, for example node 1', include optical pre-amplifiers OA for compensating signal attenuation in the optical fibers. (A small wavelength separation between the channels is desirable since the gains of the optical pre-amplifiers typically vary with wavelength; this ensures a nearly uniform gain for each channel.) In the network of FIG. 2a, for example, the dominant noise in each receiver R is not thermal noise but noise due to beating between the optical signal and the ASE. Under such conditions, decreasing the received signal power is not crucially important. Exit fibers leading from each pair of wavelength-channel selectors (e.g., WDMs 22, 28) are coupled into respective single receivers R, instead of into two separate receivers, for each channel. This embodiment requires no switch and/or software for choosing the right receiver.

Figure 2C:
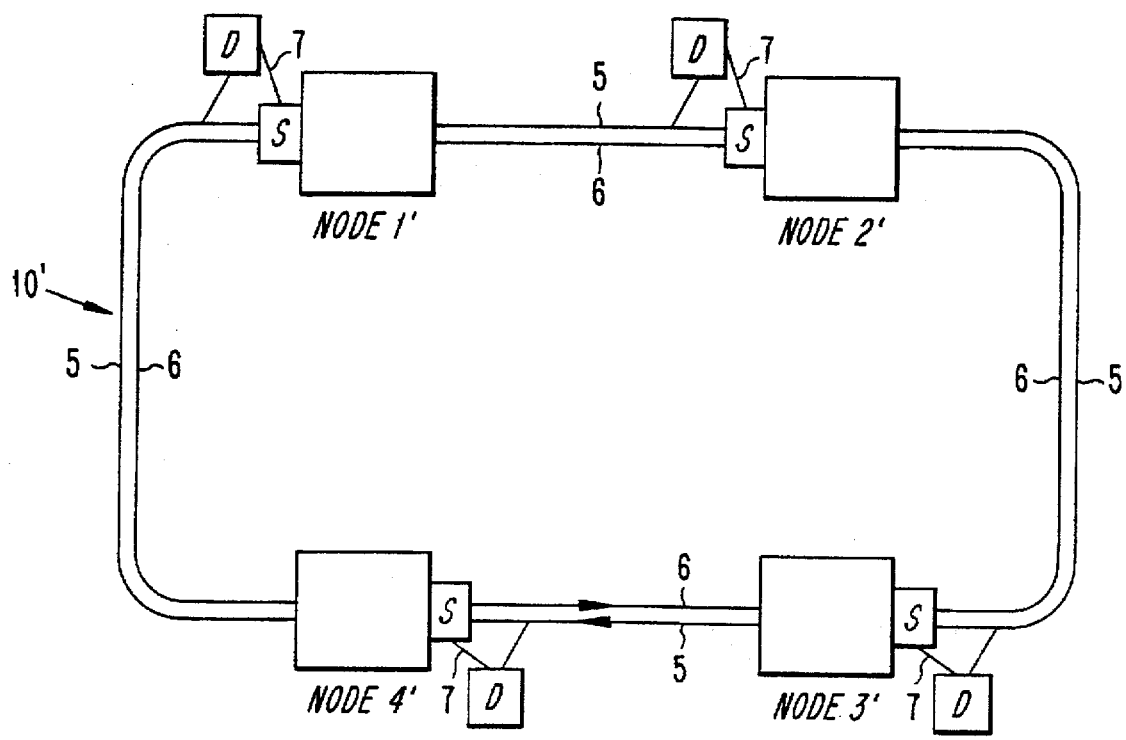
Figure 2D:
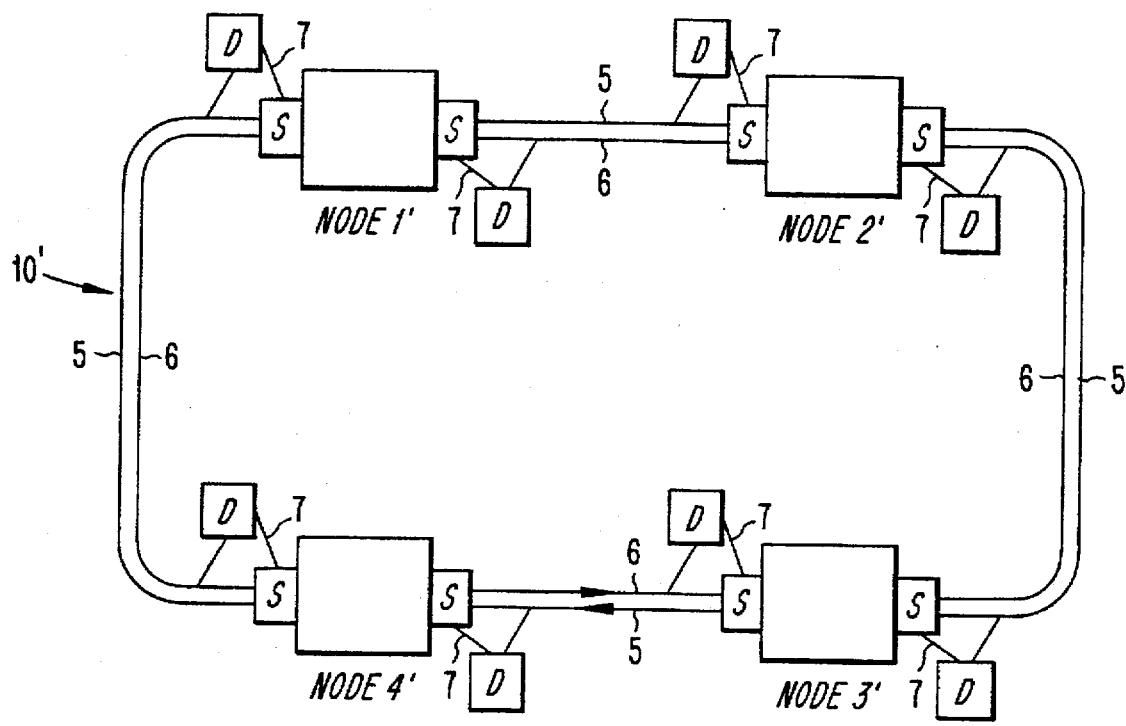

Each node further includes means for detecting a cable break. A cable break between two nodes can be detected as a loss of ASE coming into a node from a direction or a loss of all wavelength channels from a direction. These two main ways of detecting a cable break are then used in controlling the network, depending on whether node control is centralized or local. FIGS. 1a, 1b, 2a, 2b depict networks that are centrally controlled. In centrally controlled networks, signalling between nodes is controlled by a network management circuit 40. FIGS. 2c and 2d depict locally controlled networks. In locally controlled networks, signalling between nodes is controlled by electronics within each node.

For a network having centralized node control, it is first detected which channels are lost, and then it is determined where the break has occurred. Next, the blocking (off) node switch is opened (turned on), and the node switch that is on the same side as the cable break is closed (turned off). As depicted in FIGS. 1a, 1b, 2a, and 2b centralized node control networks must include one two-way switch in each node.

Figure 3:
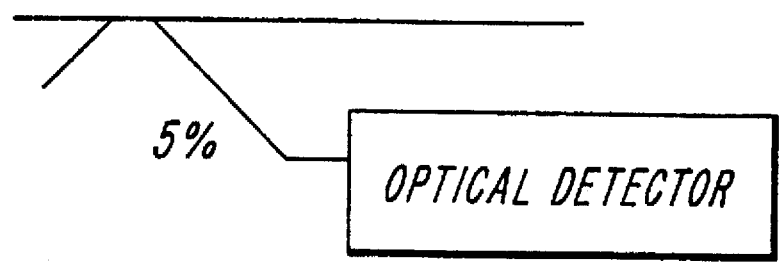
FIG. 3 illustrates a device for determining whether or not a wavelength channel is present.

One way of detecting if a channel is present or not is to superimpose a pilot tone on the channel. As illustrated in FIG. 3, a node can then easily extract the pilot tone that identifies the channel by means of a simple coupler and detector, including some simple electronics. The detector in FIG. 3 detects the absence of optical power or the presence of the pilot tones modulating the channels in one of the fibers 5, 6 based on only a small part, e.g., 5%, of the optical power in the fiber. A technique for detecting a pilot tone is disclosed in G. R. Hill et al., "A Transport Network Layer Based on Optical Network Elements", *IEEE J. Lightwave Technol.*, vol. LT-11, pp. 667–676 (May/June 1993), which is incorporated here by reference.

Instead of a pilot tone, a separate wavelength channel can be used for detecting a cable break. The separate channel can be a low-bit-rate channel, so that no optical filter is needed to detect the channel.

Another way of detecting a cable break is by detecting the ASE or the optical power arriving at a node. If a node loses all channels, i.e., the power coming into the side of the node at which the switch is disposed is lost, the switch in that node turns off, and the node starts sending a pilot tone in one or more of the channels for telling the node that was originally switched off to turn its switch on.

In locally controlled networks such as those illustrated in FIGS. 2c and 2d, decisions are made at every node, and the status of the entire network does not have to be known to take action. FIG. 2c shows a network having locally controlled nodes, with one switch S in every node and a power or pilot-tone detector D disposed in front of each switch. A detection result of each detector D is sent to a respective switch S via an electrical connection 7. Each detector D may take the form illustrated in FIG. 3.

The status of the network before a break occurs is that one node has its switch S in a blocking (off) position and all the other switches are in a transmitting (on) position. If a node loses all channels coming into the side of the node that the switch is on, then the switch in that node shuts off. The node that was originally shut off no longer detects all channel signals from its on side but detects channel signals coming into its off side from the node that has shut off. Therefore, the node that was originally shut off turns its switch on. The connections between the nodes are in this way re-established.

For example, referring to FIG. 2c, assume that switch S in node 1' is initially off to prevent ASE for circulating. If a cable break occurs between nodes 3' and 4', the detector D in node 4' will detect the break and a signal will be sent along connection 7 to cause the switch S in node 4' to turn off. Node 1' will detect channels from nodes 2' and 3' from its on side and detect a channel communicated from node 4' from its off side, causing the switch S in node 1' to turn on.

Locally controlled networks such as shown in FIGS. 2c, 2d require two-way switches S and a power, or pilot-tone, detector D in front of the switch in every node. Such networks will not protect against breaks in only the fiber not having the detector D. To protect against a single fiber break, i.e., a break in just one direction along fiber 5 or fiber 6, a node can be configured according to FIG. 2d, which shows a network having nodes that each include two switches S and two power, or pilot-tone, detectors D, each detector being connected in front of a respective switch.

Before a break occurs, a first node has the switch on its right side shut off and the node immediately to the right of the first node has the switch on its left side shut off. All other switches are in the transmitting (on) position. If a node loses all channels from one side, i.e., the power coming from one side of the node is lost, the switch on this side of the node shuts off. Since shutting off that switch breaks both directions, the switch in the node on the other side of the break will also detect a power loss and shut off. Thus, the switches on either side of a cable break shut off if the power disappears, ensuring that a break in just one fiber will be noticed.

For example, referring to FIG. 2d, assume that initially switch S on the right side of node 1' and switch S on the left side of node 2' are off to prevent circulation of ASE. If a cable break occurs between nodes 3' and 4', the detector D on the left side of node 3' and the detector D on the right side of node 4' will detect the break. Signals will be sent along connections 7 to cause the switch S on the left side of node 3' and the switch S on the right side of node 4' to turn off. Nodes 3' and 4' will then communicate with nodes 1' and 2' and cause the switch S on the right side of node 1' and the switch S on the left side of node 2' to turn on either by one or more pilot tones or by a separate wavelength channel.

In accordance with Applicant's invention, when a cable break occurs, the node originally having the blocking (off) switch resets its switch to a transmitting (on) position and the node switch (or switches) adjacent to the cable break shuts off, the latter to ensure a break in both directions. In this way, a bus is provided that can change its starting and stopping point depending on where a cable break occurs. A great advantage is that none of the nodes are isolated by the cable break, and all transmitters and receivers can remain in the same operating condition as before the break.

Since the optical bandwidth of the network is limited, it is desirable to keep the number of required wavelengths to a minimum. Waveform reconfiguration permits wavelengths to be re-used, thus reducing the number of required wavelengths in the network. If a reconfiguration of the wavelengths is permitted when a cable break occurs, the required number of wavelengths decreases from $M(M-1)/2$ to $(M^2-1)/4$, where M is the number of nodes. (Of course, if the number of nodes is even, the required number of wavelengths would decrease from $M(M-1)/2$ to $M^2/4$). By re-configuring wavelengths, the number of nodes in a network can be increased without increasing the number of required wavelengths. This allows for large growth of the network to service a greater number of users.

Wavelength reconfiguration can be done by utilizing either tunable lasers or extra lasers in the nodes. Tunable lasers permit selection of particular wavelengths as carriers for particular respective information, and tunable filters, such as the add-drop filters described in more detail below, are useful as wavelength-selective elements in the tunable lasers for selecting the particular wavelengths. At the receiving end, using tunable filters as the selectors 22–32 in FIG. 1b provides simultaneous selection of desired channels by the filters and detection of the channels by the receivers connected to the filters.

FIGS. 4a–4f illustrate examples of add-drop filters for a network as described above. The add-drop filters depicted in FIGS. 4a–d and FIG. 4f permit re-use of a wavelength by dropping information carried on a particular wavelength and adding different information carried on the same wavelength.

Figure 4A:
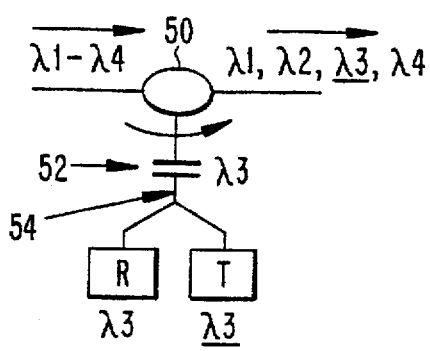
FIGS. 4a–4f illustrate examples of add-drop filters for a network.

FIG. 4a shows an add-drop filter that includes an optical circulator 50 and an adjustable fiber Fabry-Perot etalon (FPE) 52. A receiver R and a transmitter T are coupled to the fiber FPE 52 by a suitable device such as an optical splitter 54. Of course, a single transmitter or receiver could be provided after the FPE 52. The optical circulator 50 propagates wavelength channels from port to port in a conventional way, and the FPE is adjusted to pass a selected one of the wavelength channels. In FIG. 4a, information $\lambda3$ arriving at the node is passed through the FPE 52, which is tuned to the wavelength $\lambda3$, to the receiver R and is replaced by departing information $\lambda3$ emitted by the transmitter T that passes through the FPE 52.

Suitable optical circulators are commercially available from several manufacturers, including the model CR1500 made by JDS Fitel. The Fabry-Perot etalon may be of a commercially available type, such as the FFP-TF made by Micron Optics. Fabry-Perot-etalon filters exhibit high levels of stability and performance, ease of tuning and locking onto a given wavelength, and small, rugged packaging, which makes them ideal for WDM applications. The above-cited paper by C. M. Miller et al. describes this in more detail and is incorporated here by reference.

Figure 4B:
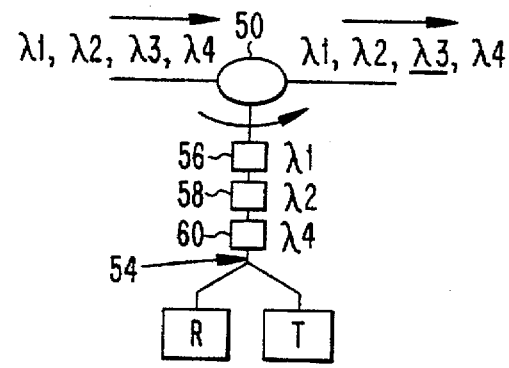

FIG. 4b illustrates an add-drop filter that uses fiber gratings, the performance of which is described in the above-cited paper by V. Mizrahi et al. that is incorporated here by reference. The filter includes an optical circulator 50, a receiver R, a transmitter T, and a device such as an optical splitter 54 arranged in a manner similar to the filter illustrated in FIG. 4a. Instead of the FPE 52, three fiber gratings 56, 58, 60 collectively act as a simple band-pass transmission filter for passing the carrier wavelength 3. Each of the gratings 56, 58, 60 rejects a wavelength, and together they reject all channels not used in the node. The desired wavelength $\lambda3$ passes unaffected between the grating stop-bands. In FIG. 4b, arriving information $\lambda3$ passes through the fiber gratings to receiver R and is replaced by departing information $\lambda3$ that passes through the fiber gratings and is added to the channels $\lambda1$, $\lambda2$ and $\lambda4$.

Fiber gratings are simple, insensitive to polarization, have flat pass-bands, and are compatible with optical fibers. Fiber gratings also exhibit outstanding cross-talk performance, which makes them particularly suited to WDM optical communication systems that typically require small channel spacings.

Figure 4C:
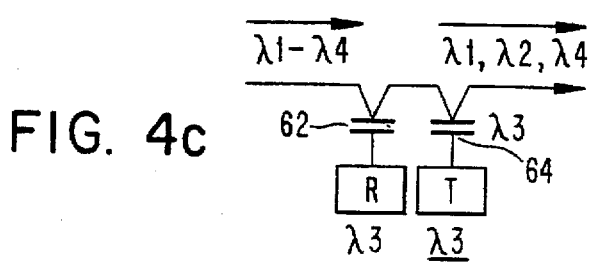

FIG. 4c illustrates another embodiment of an add-drop filter that includes two three-port FPEs 62, 64, each of which captures optical power rejected (reflected) from the etalon so that the third port acts as a tunable band-stop or notch filter.

Figure 5A:
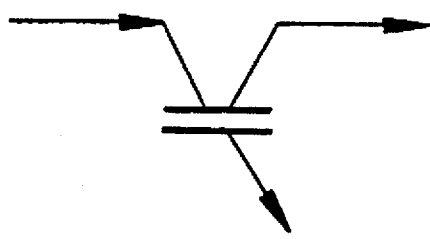
FIGS. 5a–5b depict alternate arrangements for a three-port Fabry-Perot etalon filter.
Figure 5B:
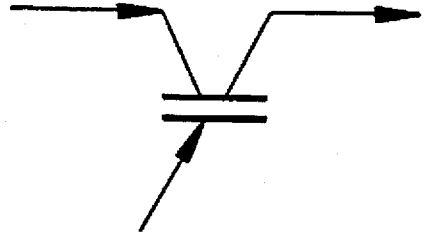

A three-port FPE is an etalon having one in-port and one out-port on one side and one out-port or in-port on the other side, as depicted for example in FIGS. 5a and 5b. The FPE 62 in FIG. 4c has two in-ports, one on each side, as in FIG. 5b. In FIG. 4c, the three-port FPE 62 is tuned to channel $\lambda3$ and prevents departing information $\lambda3$ emitted by transmitter T from passing through to the receiver R.

Figure 4D:
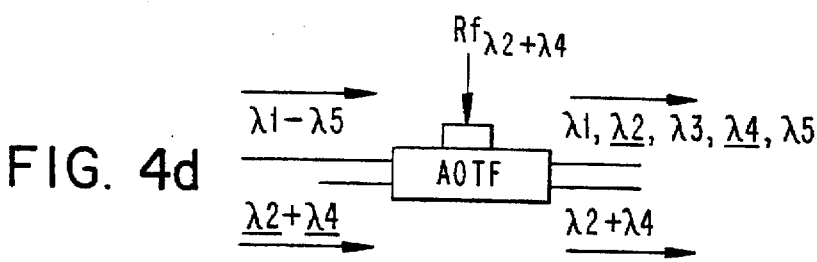

FIG. 4d shows an add-drop filter that includes an acousto-optic transmission filter (AOTF), one of which is described in the above-cited paper by I. E. Baran et al. that is incorporated here by reference. The AOTF acts as a switch that directs nearby channels, simultaneously and independently, to either of two ports. The AOTF distributes channels by flipping the polarization state of a carrier having an optical frequency that is a multiple of an applied sound frequency Rf. Optical channels having frequencies that are multiples of the applied sound frequency Rf are directed into one port of the AOTF, while other optical channels are directed to the other AOTF's other port. In FIG. 4d, the applied sound frequency Rf is assumed to contain a frequency corresponding to wavelength λ2 and a frequency corresponding to wavelength λ4 so that arriving old information λ2 and λ4 is directed into the same output port and channels λ1, λ3, λ5 are directed to another output port. At the same time, departing new information λ2 and λ4 that is provided to another input port of the AOTF is directed to that other output port.

The AOTF is uniquely suited for WDM applications because it can simultaneously route many wavelength channels, selected substantially at random; except for the relationship between optical frequency and applied sound frequency, there is no constraint on the order or adjacency of the selected wavelengths. Integrated AOTFs are not yet commercially available, although AOTFs can be made of commercially available discrete components.

Figure 4E:
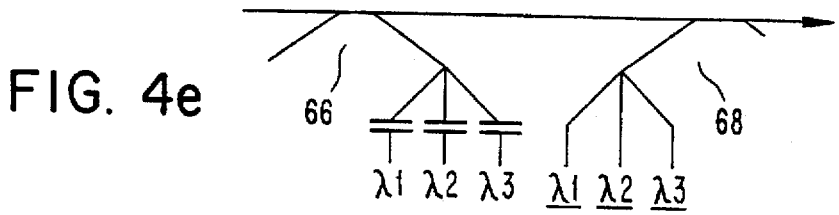
Figure 4F:
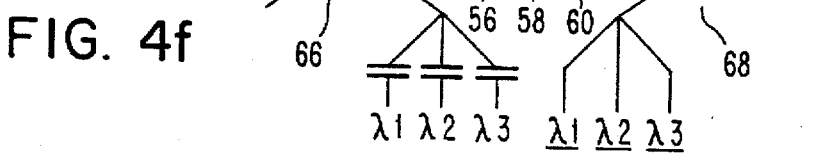

Other ways of implementing an add-drop filter can be used, as shown in FIGS. 4e and 4f. The simplest way to add channels to a fiber is to use ordinary couplers 66, 68 as shown in FIG. 4e. The add-drop filter of FIG. 4e does not permit wavelength re-use. To be able to re-use wavelengths, fiber gratings 56, 58, 60 are placed between the two couplers 66, 68, as shown in FIG. 4f. An integrated Mach-Zehnder filter could also be used.

Re-using wavelengths requires high-performance add-drop filters. Some of the filters described above may need further development before they fulfill the required demands.

Applicant's FBDNA solves the problem of protection switching of the traffic in an optical network in an easy way by combining the advantages of ring- and bi-directional-bus structures. Since the FBDNA is optically a bi-directional bus, it also solves the problem with circulating ASE. The FBDNA requires few and not very advanced components and is therefore a good economical approach to communication.

While particular embodiments of Applicant's invention have been described and illustrated, it should be understood that the invention is not limited thereto. This application contemplates any and all modifications that fall within the spirit and scope of Applicant's invention as defined by the following claims.

What is claimed is:

1. An optical fiber communication network for transmitting information on wavelength channels comprising:

a cable having two optical fibers;

a plurality of nodes connected by the cable, wherein the nodes are arranged in a ring, and the nodes and cable form a bi-directional bus;

means, for each node, for selection wavelength channels in each node for transmitting information;

a plurality of node switches, one for each node, wherein every node switch but one is in an on position permitting transmission of information and one node switch is in an off position blocking transmission of information;

means for detecting a break in the cable; and means for switching, in response to detection of a break, the node switch that is in the off position to an on position and the node switch in a node adjacent to the break and on the same side of the node as the break to an off position.

2. The network of claim 1, wherein each node includes at least two receivers and one transmitter for a respective wavelength channel.

3. The network of claim 1, wherein each node includes at least one receiver and one transmitter for each wavelength channel.

4. The network of claim 1, wherein the wavelength channel selecting means includes wavelength reconfiguration means for permitting re-use of a wavelength, the wavelength reconfiguration means reducing a number of wavelengths used in the network from M(M 1)/2 to (M² 1)/4, where M is the number of nodes.

5. The network of claim 4, wherein the wavelength reconfiguration means includes an add-drop filter, the add-drop filter comprising one of the group including an optical circulator and a Fabry-Perot etalon, an optical circulator and a fiber grating, two three-port Fabry-Perot etalons, and an acousto-optic transmission filter.

6. The network of claim 1, wherein the wavelength channel selecting means includes an add-drop filter, the add-drop filter comprising optical couplers and filters.

7. The network of claim 1, wherein each node includes optical preamplifiers.

8. A method of transmitting information on wavelength channels in an optical fiber communication network having a number of nodes and a cable including two optical fibers, the nodes being arranged in a ring, the nodes and cable forming a bi-directional bus, and each node including one node switch, the method comprising the steps of:

selecting wavelength channels in each node for transmitting information;

setting every node switch but one in an on position permitting transmission of information;

setting one node switch in an off position blocking information transmission;

detecting a break in the cable; and when a break is detected, setting the node switch that is in the off position to an on position, and setting the node switch in a node adjacent to the break and on the same side of the node as the break to an off position.

9. The method of claim 8, wherein the step of selecting wavelength channels includes the step of re-configuring wavelengths in the network to permit re-use of a wavelength to reduce a number of wavelengths in the network from M(M 1)/2 to (M² 1)/4, where M is the number of nodes.

10. The method of claim 9, wherein the re-configuring step includes the step of add-drop filtering, the step of add-drop filtering being performed by one of the group comprising an optical circulator and a Fabry-Perot etalon, an optical circulator and a fiber grating, two three-port Fabry-Perot etalons, and an acousto-optic transmission filter.

11. The method of claim 8, wherein the step of selecting wavelength champ els includes the step of add-drop filtering, the step of add-drop filtering being performed by optical couplers and filters.

12. An optical fiber communication network for transmitting information on wavelength channels, comprising:

a cable having two optical fibers;

a plurality of nodes connected by the cable, the nodes being arranged in a ring and the nodes and cable forming a bi-directional bus;

means, for each node, for selecting wavelength channels in each node for transmitting information;

a plurality of node switches, one on each side of each node, wherein a first node has a first switch on one side in an off position and a second node adjacent to the first node on the same side as the first switch has a second switch on that same side in an off position, the first and second switches blocking transmission, and every other switch in an on position permitting transmission of information;

means for detecting a break in the cable;

means for switching, in response to detection of the brink, the first and second node switches that are in the off position to an on position and the node switches adjacent to the break on both sides of the break to an off position.

13. The network of claim 12, wherein each node includes at least two receivers and one transmitter for a respective wavelength channel.

14. The network of claim 12, wherein each node includes at least one receiver and one transmitter for each wavelength channel.

15. The network of claim 12, wherein the wavelength channel selecting means includes wavelength reconfiguration means for permitting re-use of a wavelength, the wavelength reconfiguration means reducing a number of wavelengths used in the network from M(M 1)/2 to (M$^2$ 1)/4, where M is the number of nodes.

16. The network of claim 15, wherein the wavelength reconfiguration means includes an add-drop filter, the add-drop filter being one of the group comprising an optical circulator and a Fabry-Perot etalon, an optical circulator and a fiber grating, two three-port Fabry-Perot etalons, and an acousto-optic transmission filter.

17. The network of claim 12, wherein the wavelength channel selecting means includes an add-drop filter, the add-drop filter comprising optical couplers and filters.

18. The network of claim 12, wherein each node includes optical preamplifiers.

19. A method of transmitting information on wavelength channels in an optical fiber communication network having a number of nodes and a cable including two optical fibers, the nodes being arranged in a ring, the nodes and cable forming a bi-directional bus, and each node including a node switch on each side of the node, the method comprising the steps of:

selecting wavelength channels in each node for transmitting information;

setting a first switch on one side of a first node in an off position and a second switch in a second node adjacent to the first node on the same side as the first switch in an off position, the first and second switch blocking transmission of information;

setting every other node switch in an on position permitting transmission of information;

detecting a break in the cable; and when a break is detected, setting the first and second node switches that are in the off position to an on position and the node switches adjacent to the break on both sides of the break to an off position.

20. The method of claim 14, wherein the step of selecting wavelength channels includes the step of re-configuring wavelengths in the network to permit re-use of a wavelength to reduce a number of wavelengths in the network from M(M 1)/2 to (M$^2$ 1)/4, where M is the number of nodes.

21. The method of claim 20, wherein the re-configuring step includes a step of add-drop filtering, the step of add-drop filtering being performed by one of the group comprising an optical circulator and a Fabry-Perot etalon, an optical circulator and a fiber grating, two three-port Fabry-Perot etalons, and an acousto-optic transmission filter.

22. The method of claim 19, wherein the step of selecting wavelength channels includes the step of add-drop filter, the step of add-drop filtering being performed by optical couplers and filters.

* * * * *